J. WALDEN & G. PLATTS.
Machines for Gumming the Edges of Elastic Shoe Gores.

No. 143,798. Patented Oct. 21, 1873.

UNITED STATES PATENT OFFICE.

JOSEPH WALDEN AND GEORGE PLATTS, OF NEWARK, NEW JERSEY.

IMPROVEMENT IN MACHINES FOR GUMMING THE EDGES OF ELASTIC SHOE-GORES.

Specification forming part of Letters Patent No. 143,798, dated October 21, 1873; application filed April 7, 1873.

*To all whom it may concern:*

Be it known that we, JOSEPH WALDEN and GEORGE PLATTS, both of the city of Newark, in the county of Essex and State of New Jersey, have invented a certain new and useful Machine for Gumming the Edges of any Fabric or Material used in the Manufacture of Shoes, or which is otherwise applicable in the useful arts; and we do hereby declare the following to be such a full, clear, and exact description of our said invention as will enable any one skilled in the art to which it most nearly appertains to make and use the same, reference being had to the annexed drawing, making part of this specification, in which—

Figure 3:
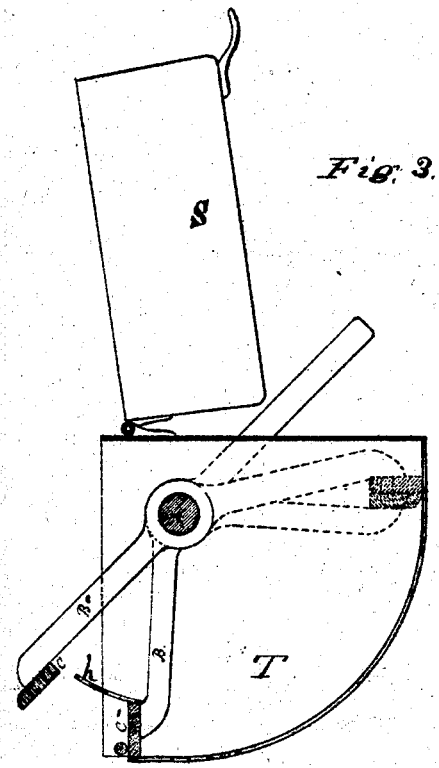
Figure 1:
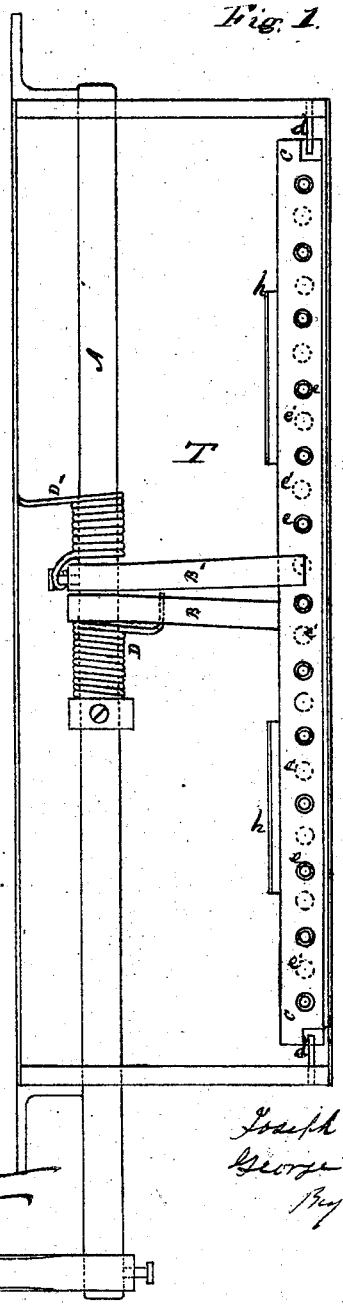
Figure 2:
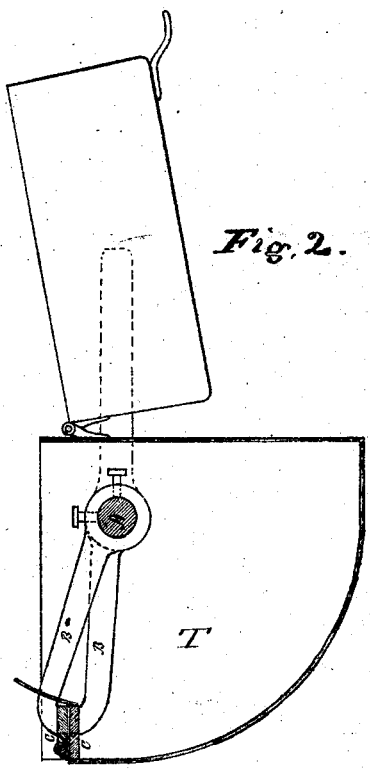

Figure 1 is a plan or top view of our said invention; and Figs. 2 and 3 are transverse sections of the same, showing the working parts thereof in different positions.

Letters Patent of the United States were heretofore granted to Joseph Walden, one of these applicants, for his invention of a machine for fitting and sticking together the different parts of congress gaiters. In the practice of that invention it is necessary to have some means of quickly and effectually gumming of the parts to be fitted and stuck together. The object of this invention is more especially intended to supply the desired means of gumming these parts, though it may be used for gumming the edges of any suitable fabric or material which it may be desirable to stick together in the fabrication of any articles of manufacture.

The machine consists of a trough, illustrated in the drawing by T. In this trough a shaft, A, is arranged in the manner substantially as shown. This shaft is fitted with two arms, B' B. The arm B' is fixed to the shaft with a set-screw, while the arm B is loose upon it, leaving the shaft free to turn in the hub of the arm. This shaft is also fitted with two springs, D D'. One end of the spring D leans against the lower side of the arm B, while the other end is secured in a collar fixed upon the shaft, so that the energy of the spring is exerted in holding the jaw $c'$ on the end of the arm B against the jaw $c$ on the end of the arm B'. One end of the spring D' is fixed to the rear part of the arm B', while the other leans against the back part of the trough, so as to throw the jaws $c$ $c'$ up to the position shown in Fig. 2, after they have been turned down to the position shown in dotted lines in Fig. 3. The jaws $c$ and $c'$ on the ends of the arms B and B' are called gumming-jaws. They are made nearly as long as the trough, leaving room enough between the ends for them to work freely. Both of these jaws are perforated with small holes, as shown by $e$ and $e'$. The holes in the upper jaw being made between the holes in the lower jaw where the two are together, as shown by $e'$ in dotted lines. There is also attached to the lower jaw $c'$ two guides, $h\ h$, one on each side of the arms B' B.

Now, the operation of this invention is as follows: Let the trough be supplied with gum, filled half full, for example. The operator, by means of the handle $f$, turns the jaws down in the liquid gum to the position shown in dotted lines, Fig. 3. The spring D' then throws it back to the position shown in Fig. 2; or it may be brought back by the handle, so as to bring the upper surface of the lower jaw flush with the upper edge of the trough, or a little above it, the lower jaw being stopped in that position by means of two pins set in the inside of the trough. The upper jaw is raised up by means of the handle $f$, thus opening the jaws of the gummer to receive the fabric, which is now shoved in between them, and is gummed on both sides of the edges when the jaws are forced together. The guide-pieces $h\ h$ keep the fabric from being shoved too far through, and the holes $e$ and $e'$ collect the gum, which spreads itself over the surface of the jaws as soon as they are open, the superfluous gum being scraped off the fabric by drawing it out of the jaws while they are still closed upon it. The trough should be fitted with a lid to keep the dust and dirt out of the gum.

Having now described the nature and extent of our invention, we claim as new herein, and desire to secure by Letters Patent—

The gumming-jaws $c$ and $c'$ and gum-trough I, made and combined with reference to each other, to gum the fabric, as set forth.

JOSEPH WALDEN.
GEORGE PLATTS.

In presence of—
A. W. GREEN,
AMOS BROADNAX.